Jan. 19, 1932.  L. T. BAKER  1,841,777
TURPENTINE CUP
Filed July 1, 1929
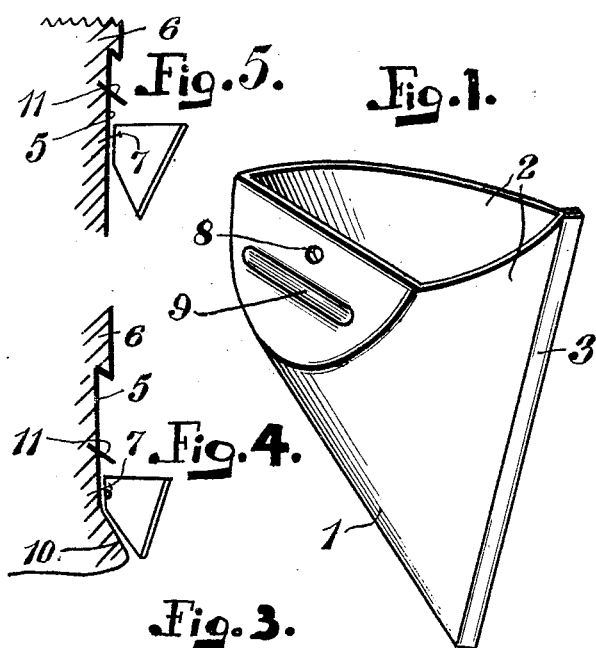
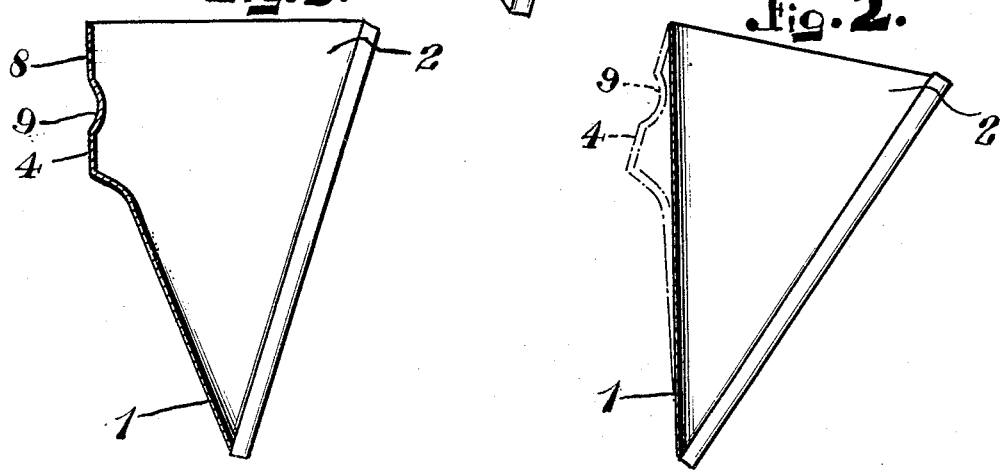
INVENTOR:
Lewis T. Baker Patented Jan. 19, 1932

1,841,777

UNITED STATES PATENT OFFICE

LEWIS T. BAKER, OF JACKSONVILLE, FLORIDA, ASSIGNOR TO LLOYD A. GRAY, OF JACKSONVILLE, FLORIDA

TURPENTINE CUP

Application filed July 1, 1929. Serial No. 375,246.

This invention relates to collecting cups and more particularly to the type of cups used for collecting sap from trees for the manufacture of turpentine.

One object of the invention is to provide a cup which is substantially triangular in shape similar to those now in use but of such construction that when it is applied to a tree it may have flat contacting engagement with the bleeding face of the tree and its open upper end extend from the tree in a horizontal plane. By this arrangement the cup may be filled to its full capacity without liability of the sap overflowing.

Another object of the invention is to so form the rear wall of the cup that it may assume the same position when applied to a newly cut tree that it does when moved upwardly upon the trunk during succeeding years.

Another object of the invention is to provide a turpentine cup which will require no more material than cups now in use but will have greater capacity.

The invention is illustrated in the accompanying drawings, wherein,

Figure 1 is a perspective view of the improved cup,

Fig. 2 is a sectional view of the cup when partially formed,

Fig. 3 is a view similar to Fig. 2 of the completed cup,

Fig. 4 is a diagrammatic view showing the improved cup applied to the bleeding face of a tree in the position it occupies the first year a tree is cut, and Fig. 5 is a view similar to Fig. 4 showing the position occupied by the cup during succeeding years.

This improved collecting cup, which may be referred to as a turpentine cup, is formed of sheet metal and is substantially triangular in shape when viewed in top plan and tapers to a point at its lower end. The blank is bent intermediate its width to form a rear wall 1 and side walls 2 which extend forwardly from opposite sides of the rear wall in converging relation to each other and their forward edges are united as shown at 3, thereby forming a cup which is quite similar in construction to those now in use. After the side walls have been united along their forward edges, the upper portion of the rear wall is forced outwardly, as indicated by dotted lines in Fig. 2, thereby providing the rear wall with an upper portion 4 which extends in a vertical plane whereas the lower portion of this rear wall extends downwardly at a forward incline. It should also be noted that the upper edges of the side walls project forwardly from the upper end of the rear wall at right angles thereto thereby causing the open upper end of the cup to be disposed in a horizontal plane when the vertically disposed upper portion of the rear wall is secured against the bleeding face 5 of a tree 6 by a nail 7 driven through an opening 8 formed in the rear wall near its upper edge and into the tree. Intermediate its depth the upper portion of the rear wall is formed with a rib 9 which extends transversely thereof and serves to reinforce this upper portion of the wall.

When this improved cup is in use, it may be applied to a tree, either as shown in Fig. 4 or as shown in Fig. 5. The first year a tree is cut the bleeding face 5 is close to the base of the tree and the roots of the tree project outwardly from the lower end of the bleeding face, as shown at 10 in Fig. 4. Since the lower portion of the rear wall projects at a forward incline from the vertically disposed upper portion of this wall, the upper portion of the wall may be secured firmly against the bleeding face of the tree with the lower portion of the cup projecting forwardly out of contact with the roots. Therefore, the cup may be firmly secured against the bleeding face of the tree beneath the gutter 11 which is applied to the tree in order to deliver sap into the cup and the open upper end of the cup will project forwardly from the tree in a horizontal plane. It will thus be seen that the cup may be filled to its full capacity without danger of the sap running out of the cup. During succeeding years the bleeding face is extended upwardly upon the tree and the cup is then shifted upwardly and secured against the bleeding face, as shown in Fig. 5. When so secured, the cup assumes a position identical with that shown in Fig. 4. It will thus be seen that in either case the upper portion of the rear wall extends in a vertical plane and the open upper end of the cup is in a horizontal plane. I have, therefore, provided a cup which may be formed from a metal blank of no greater size than needed for cups of a conventional construction but which will have a greater capacity and will not be liable to overflow.

Having thus described the invention, I claim:

1. A turpentine cup open at its top and having a rear wall bent substantially midway its upper and lower ends to form an upper portion disposed in a vertical plane and a lower portion extending downwardly at a forward incline.

2. A turpentine cup open at its top and having a rear wall formed with a minor upper portion disposed in a vertical plane and a major lower portion extending downwardly at a forward incline from the upper portion.

3. A turpentine cup open at its top and having a rear wall formed with a minor upper portion disposed in a vertical plane and having a major lower portion extending downwardly at a forward incline from the upper portion, the open top of the cup being disposed in a horizontal plane at substantially right angles to the upper portion of the rear wall.

4. A turpentine cup comprising a body open at its top and having a rear wall and side walls projecting forwardly therefrom, the rear wall having a vertically disposed minor portion and a major portion projecting downwardly at a forward incline from the minor portion, and the side walls having their upper edges disposed in a horizontal plane substantially at right angles to the upper portion of the rear wall.

5. A turpentine cup comprising a body open at its top and tapered towards its lower end, said body being formed from a metal sheet bent to form a rear wall and side walls projecting forwardly therefrom and having their front edges united, the rear wall being bent substantially midway its upper and lower ends to form an upper portion disposed in a vertical plane and a lower portion extending downwardly from the upper portion at a forward incline.

In testimony whereof I hereunto affix my signature.

LEWIS T. BAKER.